United States Patent
Atkins

(10) Patent No.: US 8,161,377 B2
(45) Date of Patent: Apr. 17, 2012

(54) ARRANGING IMAGES ON PAGES OF AN ALBUM

(75) Inventor: C. Brian Atkins, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1912 days.

(21) Appl. No.: 11/069,512

(22) Filed: Mar. 1, 2005

(65) Prior Publication Data

US 2006/0200758 A1    Sep. 7, 2006

(51) Int. Cl.
*G06N 3/00*    (2006.01)
(52) U.S. Cl. .......................................... 715/243
(58) Field of Classification Search .................. 715/513, 715/517, 523, 530, 200, 243, 253
See application file for complete search history.

(56) References Cited

U.S. PATENT DOCUMENTS

| | | |
|---|---|---|
| 5,136,686 A | 8/1992 | Kozar |
| 5,499,366 A | 3/1996 | Rosenberg et al. |
| 5,555,362 A | 9/1996 | Yamashita et al. |
| 5,712,995 A | 1/1998 | Cohn |
| 5,729,254 A | 3/1998 | Marks et al. |
| 5,760,786 A | 6/1998 | Marks et al. |
| 5,920,315 A | 7/1999 | Santos-Gomez |
| 5,956,738 A | 9/1999 | Shirakawa |
| 6,008,809 A | 12/1999 | Brooks |
| 6,301,586 B1 | 10/2001 | Yang et al. |
| 6,380,954 B1 | 4/2002 | Gunther |
| 6,415,306 B2 | 7/2002 | Seaman |
| 6,448,956 B1 | 9/2002 | Berman et al. |
| 6,563,602 B1 | 5/2003 | Uratani et al. |
| 6,636,648 B2 | 10/2003 | Loui et al. |
| 6,636,650 B1 | 10/2003 | Long et al. |
| 6,701,306 B1 | 3/2004 | Kronmiller et al. |
| 6,727,909 B1 | 4/2004 | Matsumura et al. |
| 6,771,292 B2 | 8/2004 | Sharp |
| 6,771,801 B1 | 8/2004 | Fisher et al. |
| 7,013,432 B2 | 3/2006 | Taylor et al. |
| 7,093,263 B1 | 8/2006 | Sexton et al. |
| 7,096,445 B1 | 8/2006 | Pucci et al. |
| 7,124,360 B1 | 10/2006 | Drenttel et al. |
| 7,148,990 B2 | 12/2006 | Atkins et al. |
| 7,149,968 B1 | 12/2006 | Ackerschewski et al. |

(Continued)

FOREIGN PATENT DOCUMENTS

EP    929184 A2 *  7/1999

(Continued)

OTHER PUBLICATIONS

Joe Geigel et al., "Automatic page layout using genetic algorithms for electronic albuming," Proceedings of Electronic Imaging 2001 (Jan. 2001) available on-line at http://www.

(Continued)

*Primary Examiner* — Kyle Stork

(57) ABSTRACT

Methods, machines, and machine-readable media for arranging images on pages of an album are described. In one aspect, an album has multiple potential states each corresponding to a respective arrangement of the images on the pages. In accordance with one method, the album is received in an initial state. A series of successive states from the initial state to an end state is determined. Each of the successive states is selected from candidate states in a respective neighborhood of a corresponding preceding one of the states in the series based on a heuristic evaluation of the candidate states.

7 Claims, 11 Drawing Sheets

U.S. PATENT DOCUMENTS

| | | | |
|---|---|---|---|
| 2002/0051208 A1 | 5/2002 | Venable | |
| 2002/0070982 A1 | 6/2002 | Hill et al. | |
| 2002/0095439 A1* | 7/2002 | Long et al. | 707/507 |
| 2002/0122067 A1 | 9/2002 | Geigel et al. | |
| 2003/0001879 A1 | 1/2003 | Lin et al. | |
| 2005/0071781 A1 | 3/2005 | Atkins | |
| 2005/0071783 A1 | 3/2005 | Atkins | |
| 2005/0240865 A1 | 10/2005 | Atkins et al. | |
| 2006/0200758 A1 | 9/2006 | Atkins | |
| 2006/0279566 A1 | 12/2006 | Atkins | |

FOREIGN PATENT DOCUMENTS

| | | |
|---|---|---|
| EP | 1186992 A2 | 3/2002 |
| EP | 1503336 A2 | 2/2005 |
| GB | 2378340 A | 2/2003 |
| JP | 01-191270 | 1/1989 |
| JP | 09-185728 | 7/1997 |
| JP | 10-293838 | 11/1998 |
| JP | 2002-288669 | 4/2002 |
| JP | 2002-142092 | 5/2002 |
| JP | 2003-101749 | 4/2003 |
| JP | 2003-274139 | 9/2003 |
| WO | WO 98/10356 A2 | 3/1998 |
| WO | WO 01/39019 A2 | 5/2001 |
| WO | WO02/37939 A2 | 5/2002 |
| WO | WO 02/084582 | 10/2002 |

OTHER PUBLICATIONS

Eldan Goldenberg, "Automatic layout of variable-content print data," MCs Dissertation, School of Cognitive & Computing Sciences, University of Sussex, Brighton, UK (2002).

Joe Geigel et al., "Automatic page layout using genetic algorithms for electronic albuming," Proceedings of Electronic Imaging 2001 (Jan. 2001).

Eldan Goldenberg, "Automatic layout of variable-content print data," MCs Dissertation, School of Cognitive & Computing Sciences, Univeristy of Sussex, Brighton, UK (2002).

D.F. Wong et al., "A new algorithm for floorplan design," Proc. Design Automation Conference, pp. 101-107, 1986.

* cited by examiner

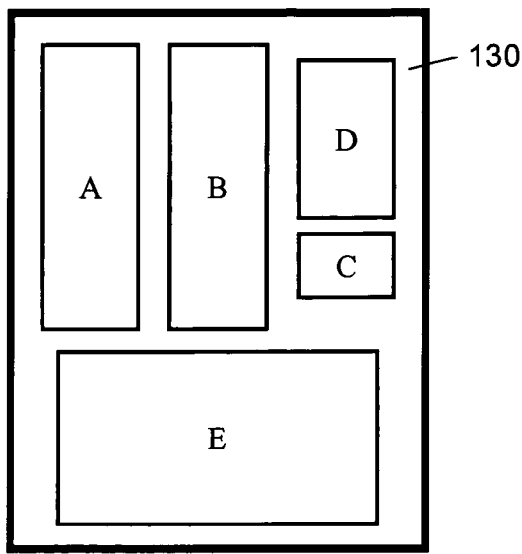
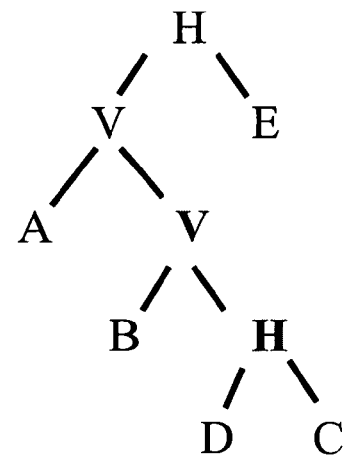
FIG. 16A  FIG. 16B
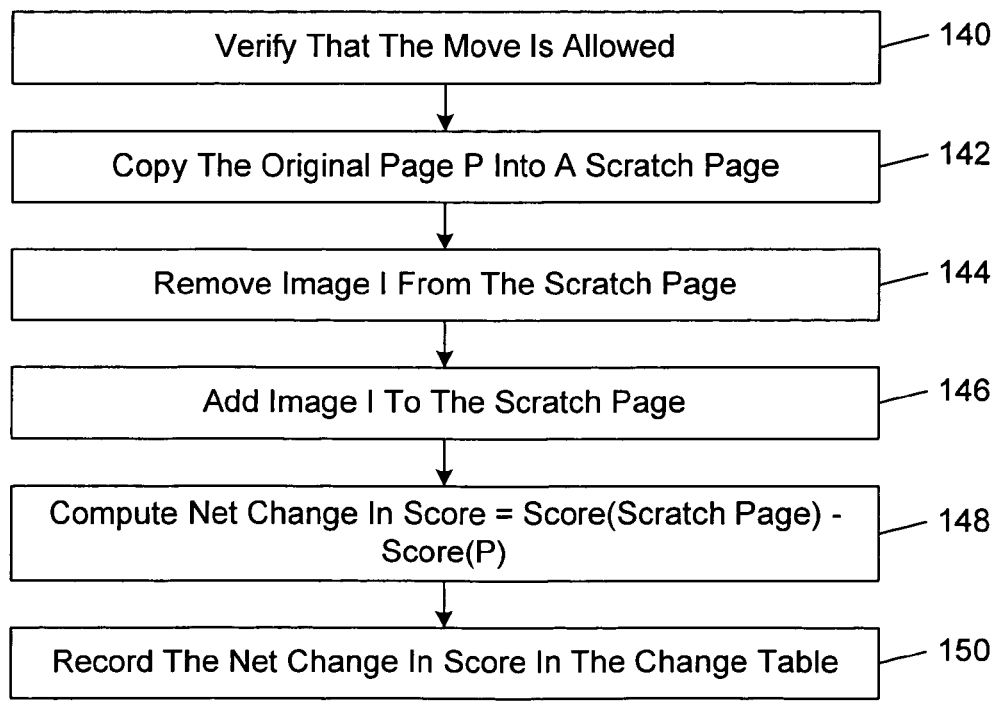
FIG. 17

ARRANGING IMAGES ON PAGES OF AN ALBUM

CROSS-REFERENCE TO RELATED APPLICATIONS

This application relates to the following co-pending applications, each of which is incorporated herein by reference: U.S. patent application Ser. No. 10/675,724, filed Sep. 30, 2004, by C. Brian Atkins and entitled "Automatic Photo Album Layout"; and U.S. patent application Ser. No. 10/675,823, filed Sep. 30, 2004, by C. Brian Atkins and entitled "Single Pass Automatic Photo Album Layout".

BACKGROUND

Individuals and organizations are rapidly accumulating large collections of digital image content, including still images, text, graphics, animated graphics, and full-motion video images. This content may be presented individually or combined in a wide variety of different forms, including documents, presentations, still photographs, commercial videos, home movies, and meta data describing one or more associated digital content files. As these collections grow in number and diversity, individuals and organizations increasingly will require systems and methods for organizing and presenting the digital content in their collections. To meet this need, a variety of different systems and methods for organizing and presenting digital image content have been proposed.

For example, there are several manual digital image albuming systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital image albuming systems to be tedious and time consuming.

Other digital image albuming systems provide various levels of automated image layout functionality. Many of these systems, however, tend to provide a user with too little interactive control over the final layout of images on an album page. For example, some systems only allow a user to change a set of layout parameters that are used to generate the layouts of images on the album pages. Other systems provide some interactive control over the final layout of the images, but respond to user commands in unpredictable or unintuitive ways. Some automated image albuming systems merely provide a user with a set of manual interactive controls that the user may use to alter an automatically-generated album page layout.

Some automated digital image albuming systems allow users to organize digital images into album pages in accordance with dates and times specified in the meta data associated with the images. These systems also typically allow users to annotate the images appearing in the digital photo album pages. Some automated digital image albuming systems provide various predefined layout templates that a user may select to create a digital photo album. In these systems, the user assigns images from the collection to various predefined image locations on a selected layout template, and the system automatically adjusts the size, placement, rotation, and framing of the images in accordance with parameters specified for the various predefined image locations on the selected template.

Some digital image albuming systems are designed to produce album pages automatically with minimal input from the user. One such system includes a page creator module and an image placement module. The page creator module assigns images in a collection to album pages based on a first genetic evolution algorithm. The image placement module generates genetic structures of page layouts for images that are assigned to a given page based on a second genetic evolution algorithm. These genetic structures define the locations, scales, and rotational orientations of the images that are placed on a given page. A layout evaluation module compares these layouts with certain other preferences and page requirements. When a suitable layout has been generated, the final album layout may be displayed, printed, or otherwise transferred for subsequent utilization.

Another automatic digital image albuming system includes a page layout module that presents to a user an album that is organized by event and is laid out automatically based on a set of albuming parameters. The number of images that are laid out on a page is determined by a parametric method or by an analysis of the attributes of the images. The parametric method divides a page into a set of grid squares and determines the number of images to be laid out on the page based on a set of rules for laying out images on the grid squares. In this system, the actual layout of images on a page also may be determined by matching attributes of the images, such as their sizes, to a set of templates.

Another automatic digital image albuming system automatically positions images on a page based on a force model that assumes that each image imposes a force on other images located on the same page. The force is a function of the distance separating the images. The system modifies an initial layout of images on the page by moving each image in a direction of the net force acting on the image by a distance that is a function of the net force.

SUMMARY

In one aspect, the invention features a machine-implemented method of arranging images on pages of an album having multiple potential states each corresponding to a respective arrangement of the images on the pages. In accordance with this inventive method the album is received in an initial state. A series of successive states from the initial state to an end state is determined, wherein each of the successive states is selected from candidate states in a respective neighborhood of a corresponding preceding one of the states in the series based on a heuristic evaluation of the candidate states.

In another aspect, the invention features a machine-implemented method of arranging images on pages of an album, in accordance with which an initial arrangement of the images on the pages of the album is received. Different candidate arrangements of the images on the pages of the album are determined, wherein each of the candidate arrangements corresponds to the initial arrangement with at least one of the images at a different respective location in the album. The candidate arrangements are evaluated. One of the candidate arrangements is selected based on the evaluation. The process of determining, evaluating, and selecting one of the different candidate arrangements, is repeated iteratively with the respective candidate arrangement selected in each of the iterations as the initial arrangement in each of the corresponding successive iterations.

The invention also features machines and machine-readable media for implementing the above-described image arranging methods.

Other features and advantages of the invention will become apparent from the following description, including the drawings and the claims.

DESCRIPTION OF DRAWINGS

FIG. 16A is a diagrammatic view of the album of FIG. 14A in a successive album state in which the layout locations of images C and D have been changed.

FIG. 16B is a tree structure representing the layout of images on the page of the album shown in FIG. 16A.

FIG. 17 is a flow diagram of an embodiment of a method of evaluating a move of an image from a layout location on a page to another layout location on the same page.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. OVERVIEW

The embodiments that are described in detail below provide ways of improving an original arrangement of images on the pages of an album by searching through a space of candidate album states for an album state that has a better arrangement than the original arrangement. Rather than exhaustively searching through all possible candidate states, these embodiments impose a heuristic structure on the candidate album space that allows these embodiments to quickly determine an improved arrangement of images in the album with a modest level of computing resources.

As used herein, the term "albuming" refers to a process of organizing images and laying out images on a page. The term "page" refers to any type of discrete area in which images may be laid out, including a physical page embodied by a discrete physical medium (e.g., a piece of paper) on which a layout of images may be printed, and a virtual, digital or electronic page containing a layout of images that may be presented to a user by, for example, an electronic display device. The term "album" refers to a discrete collection of pages. The term "album page" refers to a page of an album.

Figure 1:
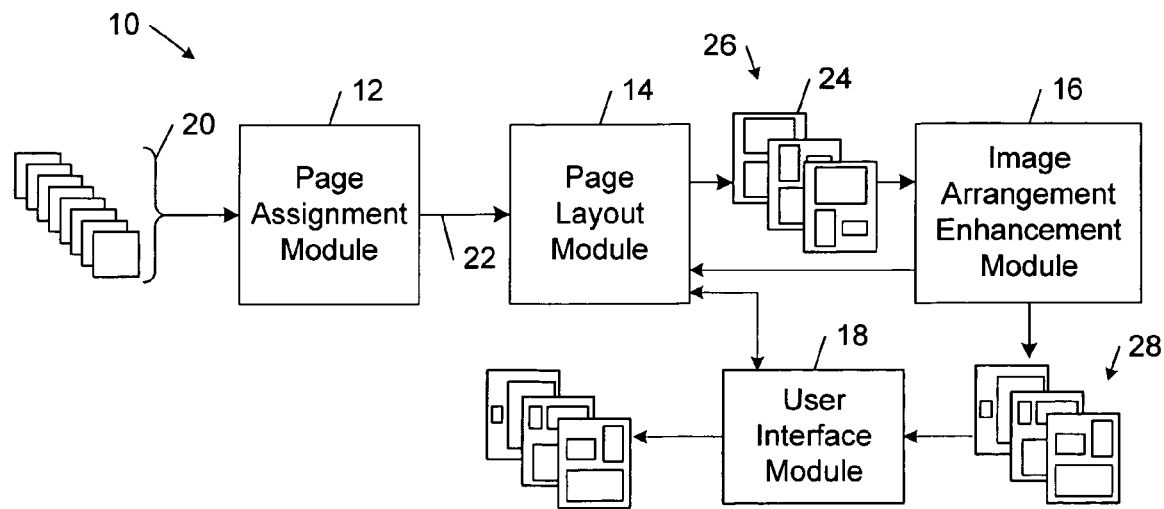
FIG. 1 is a block diagram of an embodiment of an albuming system for arranging images on pages of an album.

FIG. 1 shows an embodiment of an image albuming system 10 that includes a page assignment module 12, a page layout module 14, an image arrangement enhancement module 16, and a user interface module 18 through which a user interacts with the albuming system 10. In general, the modules 12-18 of the albuming system 10 are not limited to any particular hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

The page assignment module 12 operates on a collection of images 20, which may be designated by the user or may be identified automatically by the image albuming system 10. The images 20 may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image; and an iconographic image.

The page assignment module 12 assigns the images 20 to one or more pages of an album using any one of a wide variety of page assignment methods. In some approaches, page assignment module 12 assigns the images 20 to pages of an album based on a page-filling criterion, such as a user-specified or default maximum number of images that may be laid out on a page, or a user-specified or default fixed number of pages in an album. In these approaches, the page assignment module 12 may assign the images 20 to pages in accordance with one or more image arrangement criteria, such as a user-specified arrangement of images or a default arrangement rule that is specified in terms of meta data that is associated with the images 20. For example, the page assignment module 12 may assign images 20 to pages chronologically based on date and time meta data that is associated with the images 20. Alternatively, the page assignment module 12 may assign images 20 to pages based on an event-based analysis of the images 20.

The page layout module 14 receives from the page assignment module 12 image assignment data 22 specifying the assignments of images to the pages 24 of an initial album 26. The page layout module 14 lays the images 20 out on each album page 24 based on the image assignment data 22 as well as hierarchical page partitions that are computed for the album pages 24. The page partitions provide explicit control over the relative areas of the images 20 on the album page 24. As explained in detail below, the page layout module 14 determines a respective partition that produces an image arrangement that is suitable for the size and shape of each page. In some implementations, the page layout module 14 determines the page partitions based on a stochastic search process. In other implementations, the page layout module 14 determines the page partitions based on a deterministic search process. The page layout module 14 stores the specifications of each page layout in a respective data structure that represents a binary tree, which has leaf nodes corresponding to images and interior nodes corresponding to divisions of the corresponding page.

The images 20 may be laid out on the album pages in accordance with a "strict area" style or a "brick" style. In a strict area style layout, the relative areas of images on the same page may meet pre-specified proportions. For example, a user may specify that all images on the same page have the same area. In a brick style layout, the relative areas of images on the same page are selected so that there is no empty space between images. Additional details regarding strict area style layouts and brick style layouts may be obtained from copending U.S. patent application Ser. No. 10/675,724, filed Sep. 30, 2004, and U.S. patent application Ser. No. 10/675,823, filed Sep. 30, 2004.

The image arrangement enhancement module 16 receives the initial album 26 that is generated by the page layout module 14. The image arrangement enhancement module 16 evolves the initial album 26 from its initial state, through a series of successive states, to a end state 28, where each of the successive states in the series has an improved heuristic score relative to the preceding states. During each of the album state iterations, the image arrangement enhancement engine 16 determines a change to the arrangement of images in the current album state. In some implementations, the page layout module 14 generates modified tree structures for the pages of the album affected by the change and generates a revised album corresponding to the next successive state based on the modified tree structures. In other implementations, the image arrangement enhancement module 16 generates these modified tree structures. A description of the arrangement of images on the pages of the album in the end state 28 is passed to the user interface module 18.

In some implementations, the user interface module 18 allows a user to interactively browse the album 26 that is generated automatically by the page layout module 14. The user interface 18 also allows a user to specify edits to the album 26. Any specified edits to a given page of the album 26 are interpreted by the user interface 18. The user interface 18 transmits the interpreted user command instructions to the page layout module 14. The page layout module 14 generates a modified tree structure for a given page of the album 26 by modifying the given tree structure in accordance with the edits received from the user interface 18 and generates a revised album based on the modified tree structure. The user interface 18 presents the revised album to the user, who may browse the revised album, specify edits to the revised album, or command the image albuming system 10 to render some or all of the pages of the revised album.

II. GENERATING A LAYOUT OF IMAGES ON A PAGE

Figure 2:
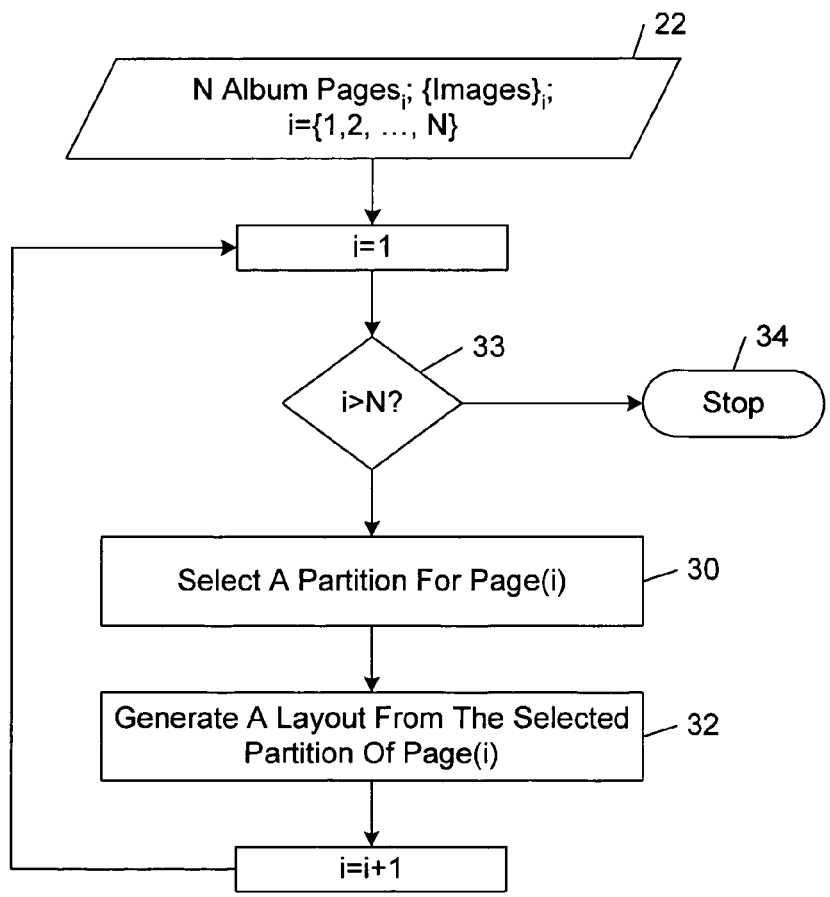
FIG. 2 is a flow diagram of an embodiment of a method of generating a layout of images on the pages of an album.

FIG. 2 shows an embodiment of a method by which the page layout module 14 generates a layout of images on a page of an album based on the image assignment data 22 received from the page assignment module 12.

In the illustrated embodiment, the image assignment data 22 includes sets of images ($\{images\}_i$) that are assigned to respective ones ($page_i$) of N pages, where i has an integer value ranging from 1 to N. In accordance with this method, the page layout module 14 selects a partition for each $page_i$ (block 30) and generates a layout from the partition selected for each $page_i$ (block 32). After each $page_i$ has been processed (block 33), the page layout module 14 stops processing the image assignment data 22 (block 34).

Detailed descriptions of the page partition selection process (block 30) and the layout generation process (block 32) are provided below.

A. Partitioning a Page

In some approaches, the page layout module 14 selects an optimal page partition using a stochastic optimization process that seeks to identify the page partition that has the highest fitness or score. Additional details of one exemplary stochastic approach for identifying an optimal page partition may be obtained from U.S. patent application Ser. No. 10/675,724, which was filed on Sep. 30, 2004.

In other approaches, including the embodiments described below, the page layout module 14 selects an optimal page partition using a deterministic process that seeks to maximize page coverage while avoiding image overlap. In an exemplary one of these deterministic approaches, the page layout module 14 computes a layout score that corresponds to coverage, which is defined as the fraction of the page occupied by images. In other embodiments, the page layout module 14 may select an optimal page partition based on a different layout score, such as layout scores based on user preferences and visual factors.

In the illustrated embodiments, each of the images 20 is assigned a respective aspect ratio and a respective positive scalar-valued relative area proportion. The aspect ratio is defined as the ratio of image height to image width. The relative area proportion assigned to a given image j is defined as the area $A_j$ of the rendered version of the given image j relative to the areas of the rendered versions of the other images appearing on the same page. Thus, for any two photos j and k on the same page, the ratio of the relative area proportions equals the ratio of rendered areas $A_j$ and $A_k$:

$$\frac{A_j}{A_k} = \frac{e_j}{e_k} \qquad (1)$$

In some embodiments, the user is allowed to set the relative area proportion values that are assigned to the images. In other embodiments, the image albuming system automatically assigns the relative area proportion values to the images.

Figure 3:
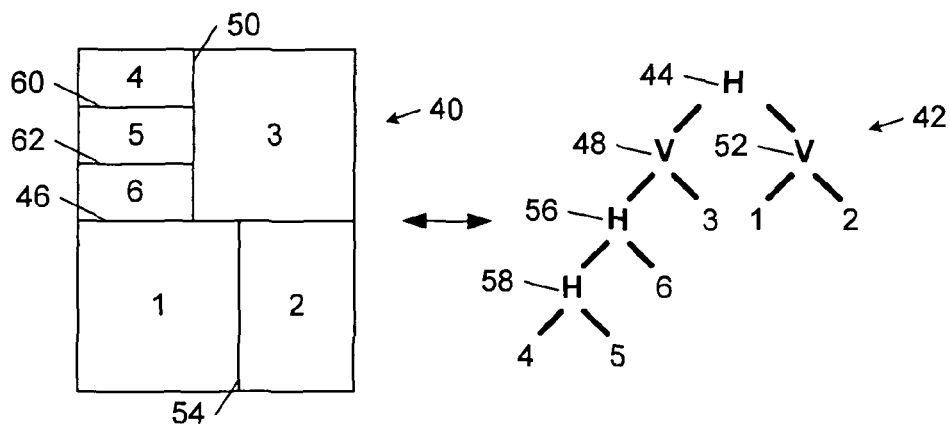
FIG. 3 is a diagrammatic view of a partition of a page and a hierarchical tree structure corresponding to the page partition.

Referring to FIG. 3, the page layout module 14 divides each page 40 in an album in accordance with a respective hierarchical partition, which is represented by a tree structure 42. Each leaf node of the tree structure 42 corresponds to a respective image (1, 2, 3, 4, 5, 6) on the page 40. Each interior node (H, V) of the tree structure 42 corresponds to one of either a horizontal or a vertical division on the corresponding page 40. In the exemplary partition of page 40 and the corresponding tree structure 42, the root H node 44 represents the horizontal division 46 of page 40. The left interior V node 48 represents the left vertical division 50 of page 40, and the right interior V node 52 represents the right vertical division 54 of page 40. The interior H nodes 56, 58 respectively represent the horizontal divisions 62, 60 of page 40. The positions of leaf nodes in the tree structure 42 specify the unique locations of the corresponding images (1, 2, 3, 4, 5) on the page 40.

Figure 4A:
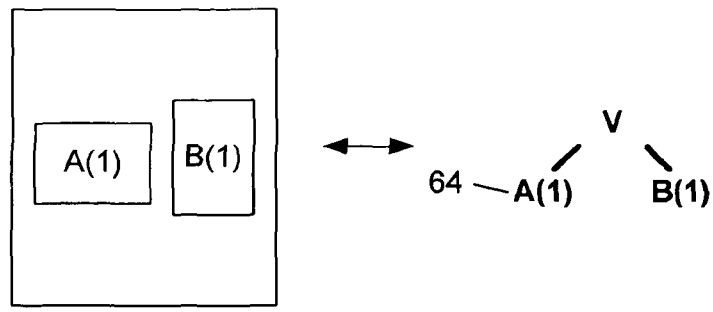
FIGS. 4A-4C are diagrammatic views of different partitions of a page and corresponding hierarchical tree structures.
Figure 4B:
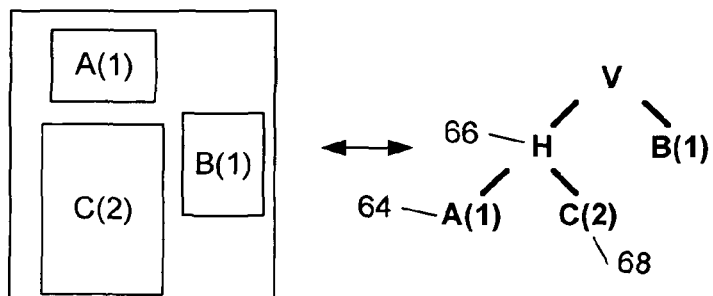
Figure 4C:
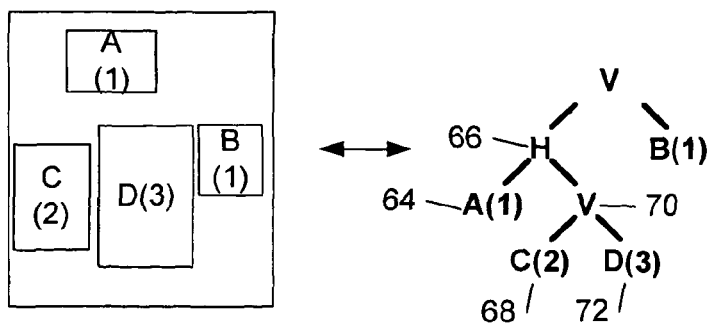

FIGS. 4A-4C illustrate a process of generating a binary tree structure by adding one image to the current tree structure at a time, where the numbers in parentheses are the relative areas assigned to the corresponding images A, B, C, D. In this process, each node in the tree structure is associated with a bounding box in the layout of a page. Each interior node is associated with a bounding box around the boxes of its two child nodes, and each leaf node is associated with a cell where a respective image is to be placed.

The tree structure generation process begins with a single image, and additional images are added to the tree structure one at a time until all of the images that are assigned to the page have been added. If the total number of images assigned to a page is M, the layout for the page corresponds to the last in an increasing sequence of binary trees:

$$T(1), T(2), \ldots, T(M) \qquad (2)$$

where $T(p)$ for $p \geq 1$ denotes a tree with p terminal nodes. Each of the intermediate trees $\{T\{p\}: 1 \leq p \leq N-1\}$ generates a viable layout.

Each new image is added to the tree structure by introducing a new cell to the previous layout. Thus, image C is added to the sub-tree structure 64 shown in FIG. 4A by displacing the sub-tree structure 64 with a new interior H node 66 shown in FIG. 4B. The new interior H node 66 becomes the parent of a new leaf node 68 corresponding to the new cell C(2) and the sub-tree 64 that was displaced. Similarly, the image D is added to the sub-tree structure 68 shown in FIG. 4B by displacing the sub-tree structure 68 with a new internal V node 70 shown in FIG. 4C. The new internal V node 70 becomes the parent of a new leaf node 72 corresponding to the new cell D(3) and the sub-tree 68 that was displaced. In the example illustrated in FIGS. 4A-4C, the selected sub-trees 64 and 68 that are displaced happened to be leaf nodes; in general, however, any sub-trees could have been selected, including sub-trees that are rooted at interior nodes.

The page layout module 14 selects which cell is introduced into a previous layout by evaluating a collection of candidate layouts. Each candidate layout corresponds to the previous layout with the new image inserted into a different new cell location. The page layout module 14 selects the cell for which the resulting layout has the highest score. That is, assuming that the p-th intermediate layout, which is represented by the tree structure $T(p)$, has a set $\Re$ of possible new cells and that the tree structure $T(p)$, which is augmented by adding the new cell $\ell \in \Re$, is denoted as $T(p; \ell)$, then the next intermediate layout is determined as:

$$T(p+1) = T(p; L) \qquad (3)$$
where
$$L = \underset{\ell \in \Re}{\mathrm{argmax}}[\mathrm{score}(T(p; \ell))] \qquad (4)$$

and where score(.) is the scoring function.

The cost of adding each next image to the layout increases linearly with the number of images. In particular, since there are $(2p-1)$ nodes in $T(p)$ and since the new cell can be positioned either vertically or horizontally relative to the box of the displaced sub-tree, the number of elements in $\Re$ (i.e. the number of possible new cells) is $2(2p-1)$ for intermediate tree structure $T(p)$. However, typical album pages tend to have sufficiently few images that the computational cost of evaluating all possible candidate layouts typically is not significant.

B. Generating a Layout from a Page Partition

Figure 5:
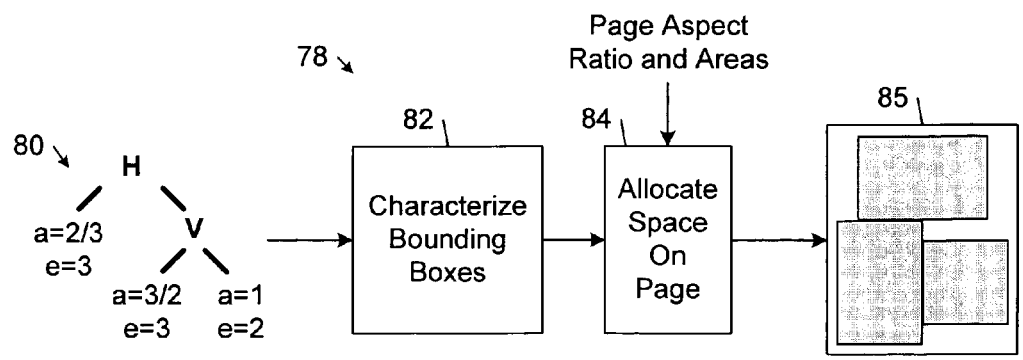
FIG. 5 is a flow diagram of an embodiment of a method of rendering an album page layout based on a partition of a page.

FIG. 5 shows an embodiment of a method 78 by which the page layout module 14 generates a layout from a page partition that has been selected for a page 85. The page partition is represented by a tree structure 80. Each leaf node of the tree structure has an aspect ratio value (a) and a relative area proportion value (e) and each interior node indicates either a horizontal or vertical division of the page. The layout generation method 78 involves characterizing the bounding boxes for the nodes (block 82), and allocating a precise region of page space to each node (block 84). The allocated regions of the page 85 are nested like the tree structure 80. The allocated regions are referred to herein as "cells". In some implementations, once a cell is known, the position of an image assigned to the cell is determined by centering the image in the cell. The area of the image is determined using the method described below.

1. Characterizing Bounding Boxes

Figure 6:
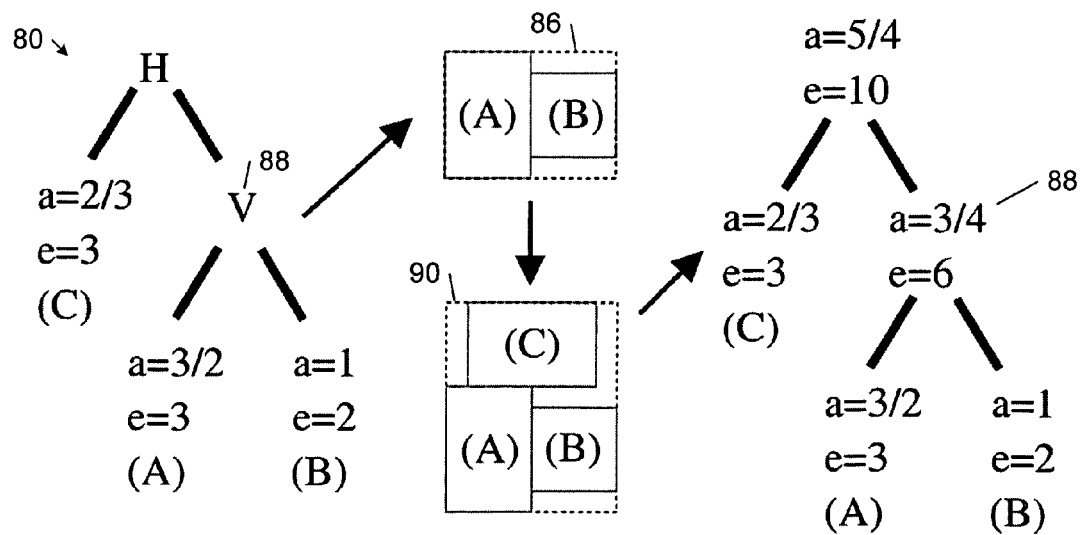
FIG. 6 is a diagrammatic view of an implementation of a method computing bounding boxes in accordance with the album page layout rendering embodiment of FIG. 5.

The objective of the bounding box characterization process (block 82) is to compute an aspect ratio value and relative area value for each interior node in the tree structure 80. Each bounding box is determined by the boxes it encloses. In some implementations, the bounding box characterization process begins at the leaf nodes and works toward the root node, in the order of a depth-first search, as illustrated in FIG. 6.

The formulas for the aspect ratio and relative area of any interior node are given below. In general, for any image bounding box with an aspect ratio a, and a relative area e, the quantities $\sqrt{ae}$ and $\sqrt{e/a}$ are the relative height and relative width of the image bounding box, respectively. The aspect ratio a, and the relative area e for any interior node are functions of the aspect ratios and relative areas of its two children. In the following equations, $a_r$ and $e_r$ are the aspect ratio and relative area of the right-hand child node, and $a_r$ and $e_r$ are the aspect ratio and relative area of the left-hand child node. Thus, if the right-hand and left-hand child nodes are arranged side-by-side:

$$a = \frac{\sqrt{a'e'}}{\sqrt{e_l/a_l} + \sqrt{e_r/a_r}} \quad (5)$$

$$e = \sqrt{a'e'}\left(\sqrt{e_l/a_l} + \sqrt{e_r/a_r}\right) \quad (6)$$

where $$\sqrt{a'e'} = \max_{i \in \{r,l\}}\left(\sqrt{a_i e_i}\right) \quad (7)$$

The aspect ratio in equation (5) is the ratio of the greater relative height divided by the sum of the two relative widths, and the relative area in equation (6) is the product of the greater relative height and the sum of the two relative widths. Finding the maximum in equation (7) determines which of the two child node boxes is relatively taller, and therefore governs the height of the parent node box.

If the two child nodes represent boxes that are arranged one on top of the other:

$$a = \frac{\sqrt{a_l e_l} + \sqrt{a_r e_r}}{\sqrt{e'/a'}} \quad (8)$$

$$e = \left(\sqrt{a_l e_l} + \sqrt{a_r e_r}\right)\sqrt{e'/a'} \quad (9)$$

where $$\sqrt{e'/a'} = \max_{i \in \{r,l\}}\left(\sqrt{e_i/a_i}\right) \quad (10)$$

In this case, equation (10) determines which of the two child node boxes is relatively wider, and therefore governs the width of the parent node box.

The bounding box of the root node conveys the shape and relative area of the entire layout corresponding to the tree structure 80. The bounding box of the root node is referred to herein as the "principal bounding box".

Since the relative areas are consistent throughout the tree structure 80, the corresponding layout can be scored as soon as the bounding boxes of the interior nodes have been computed. In some exemplary implementations, the scoring function corresponds to coverage. In these implementations, for a tree T, the fraction of the page that is covered by image is given by:

$$\text{score}(T) = \Psi \frac{\sum_{i=1}^{M} e_i}{e_{pbb}} \frac{\min\{a_{pbb}, a_{page}\}}{\max\{a_{pbb}, a_{page}\}} A_{page} \quad (11)$$

where $\Psi$ is a constant described below; M is the number of images on the page; $e_i$ is the relative area of image i; $e_{pbb}$ and $a_{pbb}$ are the relative area and aspect ratio of the principal bounding box; and $A_{page}$ and $a_{page}$ are the area and aspect ratio of the usable space on the page.

In the example shown in FIG. 6, the bounding box 86 for interior node 88 encloses the bounding boxes of leaf nodes A and B, which are arranged side-by-side. Therefore, using equations (5) and (6), the bounding box 86 is characterized by an aspect ratio of 3/4 and a relative area proportion of 6. The principal bounding box 90 encloses the bounding boxes of leaf node C and interior node 88. Therefore, using equations (8) and (9), the principal bounding box 90 has an aspect ratio of 5/4 and a relative area proportion of 10.

2. Allocating Regions of Page Space to Nodes

Figure 7:
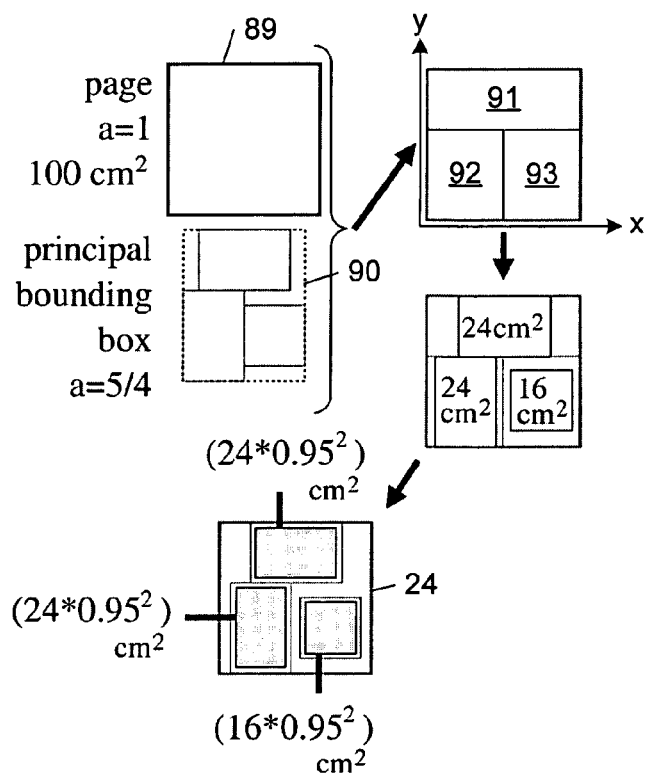
FIG. 7 is a flow diagram of an implementation of a method of allocating space on an album page in accordance with the album page layout rendering embodiment of FIG. 5.

Referring to FIG. 7, in some implementations, the process of allocating regions of page space to nodes (block 84; FIG. 5) involves dividing a page 89 into cells 91, 92, 93, and positioning each image in its respective cell. The page 89 is divided into cells 91-93 by splitting the page into rectangles, starting with the entire usable area of the page 89 as the first rectangle. Each split is accomplished by drawing a line segment for a respective one of the interior nodes, starting at the root node in order of a breadth-first search.

In the case of an interior node corresponding to a vertical division, the page layout mode 14 selects a horizontal position x along the width of the available region. In one formulation, $x \in (0,1)$, where x=0 represents the leftmost position and x=1 represents the rightmost position. In this case, $$x = \frac{\sqrt{e_l/a_l}}{\sqrt{e_l/a_l} + \sqrt{e_r/a_r}} \quad (12)$$

where $a_l$, $e_l$, and $a_r$, $e_r$ are the aspect ratios and relative areas of the bounding boxes for the left and right children of the interior node. This formulation makes direct use of relative widths as proportions. The analogous formula for a horizontal division uses the relative heights. That is, if the vertical position along the height of the available space is denoted $y \in (0, 1)$, where y=0 represents the bottom position and y=1 represents the top position:

$$x = \frac{\sqrt{e_b a_b}}{\sqrt{e_b a_b} + \sqrt{e_t a_t}} \quad (13)$$

where $a_b$, $e_b$, and $a_t$, $e_t$ are the aspect ratios ad relative areas of the bounding boxes for the bottom and top children of the interior node.

The area $A_i$ for image i is computed from the relative area proportion assigned to the image i:

$$A_i = \Psi \frac{e_i}{E_{pbb}} A_{pbb} \quad (14)$$

where $A_{pbb}$ is an area for the principal bounding box, which is computed as follows:

$$A_{pbb} = A_{page} \frac{\min\{a_{pbb}, a_{page}\}}{\max\{a_{pbb}, a_{page}\}} \quad (15)$$

where $A_{page}$ is the area of the usable page space. $\Psi$ is a scalar that is used to shrink each image from the maximum area it could have as dictated by parameters of the tree structure 80. Setting $\Psi$ between 0 and 1 creates a buffer space around each image. In one exemplary implementation, $\Psi = 0.95^2$.

The resulting layouts of the images on the pages of the album define the arrangement of images corresponding to the initial state of the album 26 shown in FIG. 1.

III. ENHANCING THE ARRANGEMENT OF IMAGES ON PAGES OF AN ALBUM

A. Overview

The image arrangement enhancement module 16 evolves the album 26 from the initial state generated by the page layout module 14 to an end state 28 that has an improved image arrangement as determined by a heuristic measure for evaluating the layouts of images on the pages of the album.

Figure 8:
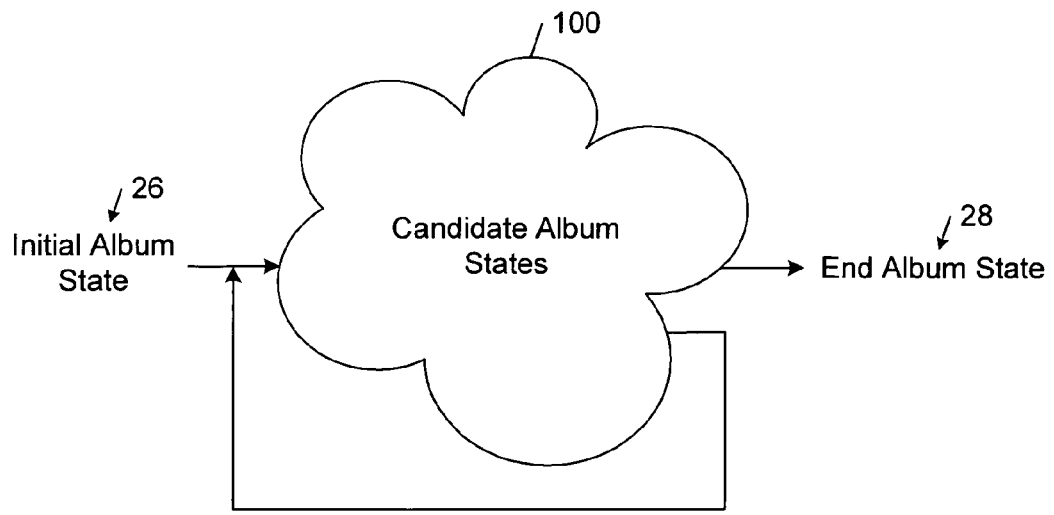
FIG. 8 is a diagrammatic view of an embodiment of a method of evolving an album from an initial album state to an end album state by iteratively searching through a space of candidate album states.

FIG. 8 diagrammatically shows an embodiment of a method by which the image arrangement enhancement module 16 evolves the album 26 from the initial album state to the end album state 28 by iteratively searching through a space 100 of candidate album states. As explained in detail below, instead of exhaustively searching through all possible candidate states, the image arrangement enhancement module 16 imposes a heuristic structure on the candidate album space that allows these embodiments to quickly determine an improved arrangement of images in the album with a modest level of computing resources.

Figure 9:
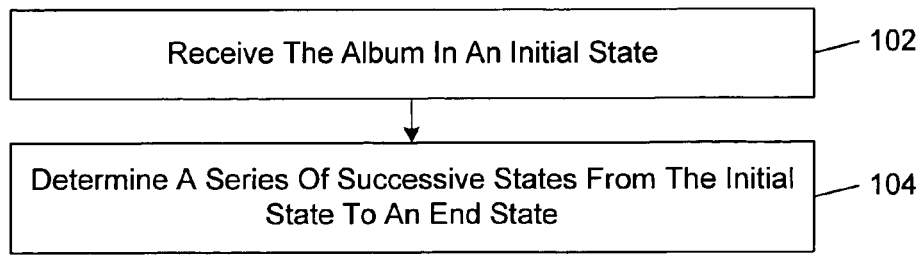
FIG. 9 is a flow diagram of an embodiment of a method of arranging images on pages of an album.

FIG. 9 shows an embodiment of a method by which the image arrangement enhancement module 16 enhances the arrangement of images on the pages of the initial album 26 that is generated by the page layout module 14. In accordance with this method, the image arrangement enhancement module 16 receives the album 26 in the initial state (block 102). The image arrangement enhancement module 16 determines a series of successive states from the initial state 26 to the end state 28 (block 104). During each of the album state iterations, the image arrangement enhancement module 16 determines a set of candidate successive album states by making one or more changes to the arrangement of images corresponding to the current album state. The number of candidate states and, consequently, the amount of computing resources needed to complete the search for the end album state 28, is controlled at least in part by limiting the number and the type of changes that can be made to the current album state to generate the current set of candidate successive states for the current search iteration.

Figure 10:
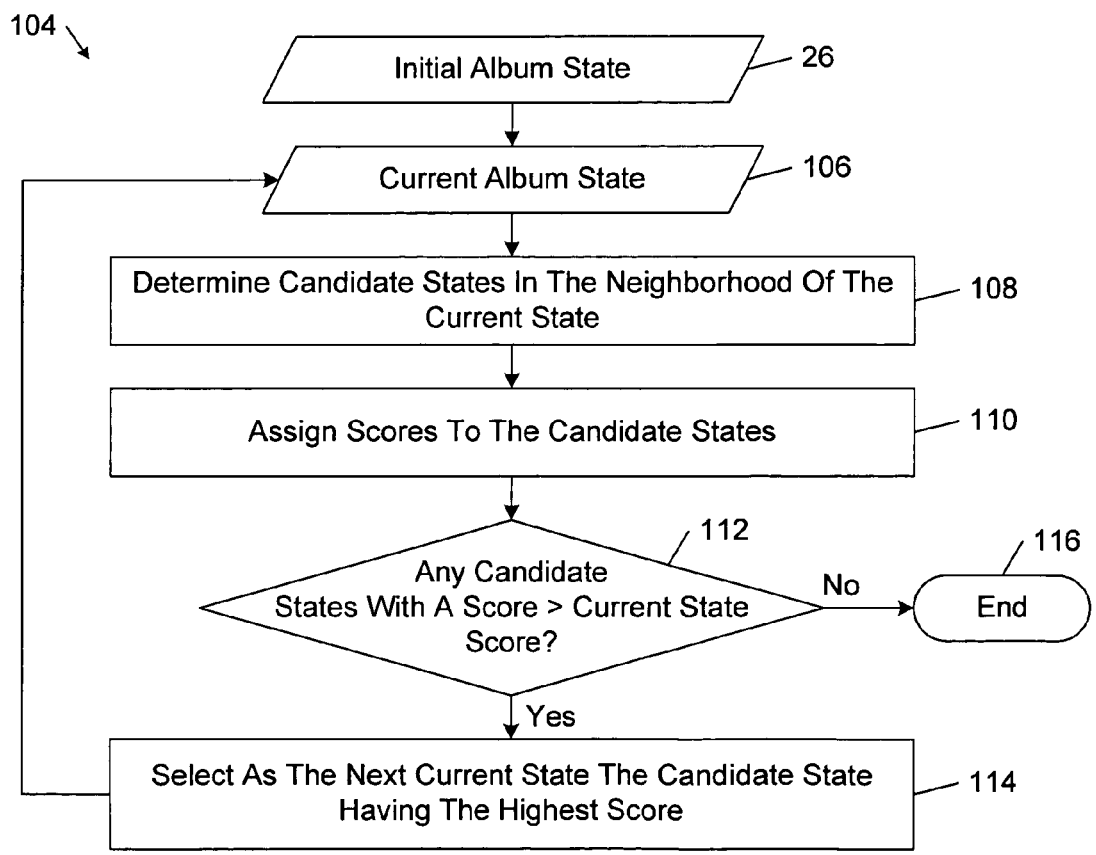
FIG. 10 is a flow diagram of an embodiment of a method of determining a series of successive album states from an initial album state to an end album state.

FIG. 10 shows a flow diagram of an embodiment of a method by which the image arrangement enhancement module 16 iteratively determines a series of successive album states from the initial album state 26 to the end album state 28. The method begins with a current album state 106 equal to the initial state 26 that is generated by the page layout module 14.

The image arrangement enhancement module 16 then determines a set of candidate states in the neighborhood of the current state 106 (block 108). In general, each of the candidate album states in the neighborhood of the current album state is generated by changing the arrangement of images in the current album state 106. Instead of considering all possible changes to the current album state 106, the image arrangement enhancement module 16 changes the current album state 106 based on a set of parameters that control the kinds of changes that can be made. Some parameters limit the number of images that can be moved during a particular change. For example, in the illustrated embodiments, each change can correspond to a move of an image from a layout location of a page to another layout location of the same page or a different page, or to an exchange (or trade) of two images on the same page or on two different pages. Some other rules limit the number of possible pages that can be affected by a change. For example, in the illustrated embodiments, each of the images in the current album state 106 can only be moved to a page within a specified number of pages (or image movement radius) of the original page on which the image is laid out in the current album state 106. The image movement radius may be determined empirically or it may be specified by a user.

After the candidates states in the neighborhood of the current album state 106 have been determined (block 108), the image arrangement enhancement module 16 assigns scores to each of the candidate states (block 110). In general, any heuristic scoring function that provides a measure of the quality of the album as a whole may be used to score the candidate states. In some embodiments, the scoring function is the same scoring function that is used by the page layout module 14 to compute layout scores summed over all of the pages of the album.

If there are any candidate states with a score that is greater than the score assigned to the current album state 106 (block 112), the image arrangement enhancement module 16 selects the candidate state having the highest score as the next current album state (block 114). The image arrangement enhancement module 16 then repeats another iteration of the search for the end state, with the selected candidate state as the current album state 106.

If none of the candidate states has a score that is greater than the current album state 106 (block 112), the method terminates (block 116). The current album state 106 at the time the method terminates is the end album state 28, which the image arrangement enhancement module 16 passes to the user interface module 18.

During the iterations of FIG. 9, that is, in considering candidate layouts and in executing selected changes, images are removed from, and added to, pages or page layouts. In the illustrated embodiments, an image is added to a page by inserting the image into the layout tree structure in the manner described above in section II. The location where the image is inserted is selected from among all possible locations, as the location that yields the highest layout score.

In any instance where an image is removed from a page, the tree structure is modified as follows. The parent of the leaf corresponding to the image being removed is identified, and then the subtree whose root is the sibling of the leaf being removed is identified. Next the identified subtree is removed from the identified tree; the leaf being removed is deleted; and the parent is replaced with the root of the subtree. That is, the leaf is deleted, and the former sibling of the leaf takes the place of their parent.

In any instance where an image is added to a tree structure or removed from a tree structure, a precise position and location for each image is recomputed in accordance with a desired style (e.g., "brick" or "strict area" style). As described above in connection with the operation of the page layout module 14, this process involves two steps: working up the tree, a bounding box is determined for each node; and then working back down the tree, regions of space are allocated to each node and leaf.

B. Tracking Candidate Successive States with Entries in a Change Table

In some implementations, the image arrangement enhancement module 16 maintains a change table during the execution of the method of FIG. 9. In this description, an image is denoted with the letter I. The variable P' is used to represent the page number of a page where an image could be located, and in some cases P' will refer to a page where an image is scheduled to be located. The variable P will refer to the page number of the page where an image is located at the beginning of the current change iteration. In each change iteration, an image is reassigned to a different location in the album: that is, in each change an image I is moved from page P to page P'.

1. Defining a Change Table

The change table contains a list of all of the allowable changes that may be made to the current album state to generate the set of candidate successive states in the neighborhood of the current album state 106. In particular, based on the image movement radius, the image arrangement enhancement module 16 deduces for each image I in the album a list of the pages on which the image could be laid out. The image arrangement enhancement module 16 generates the set K of all possible pairs (I,P') where I is a unique identifier for an image in the album and P' is a page number of the page on which the image I could be laid out. In some implementations, the image arrangement enhancement module 16 represents a move of image I from its current page to page P' with the notation M(I,P'). Similarly, the image arrangement enhancement module 16 represents a trade of image I from its current page to page P' with the notation T(I,P'). Since it is possible to move or trade any image to any of its allowable destination (or target) pages, the image arrangement enhancement module 16 defines the complete set C of allowable changes as follows:

$$C=\{c(I,P') \text{ such that } c \in \{M,T\} \text{ and } (I,P') \in K\} \quad (16)$$

In some implementations, the change table C is implemented by a ledger with one row for each change element c in C. During execution, the image arrangement enhancement module 16 maintains in each row the net change in score of the album that would result if the current album state were changed in accordance with the change specified in the corresponding row.

2. Maintaining the Change Table while Arranging Images on Pages of an Album

Figure 11:
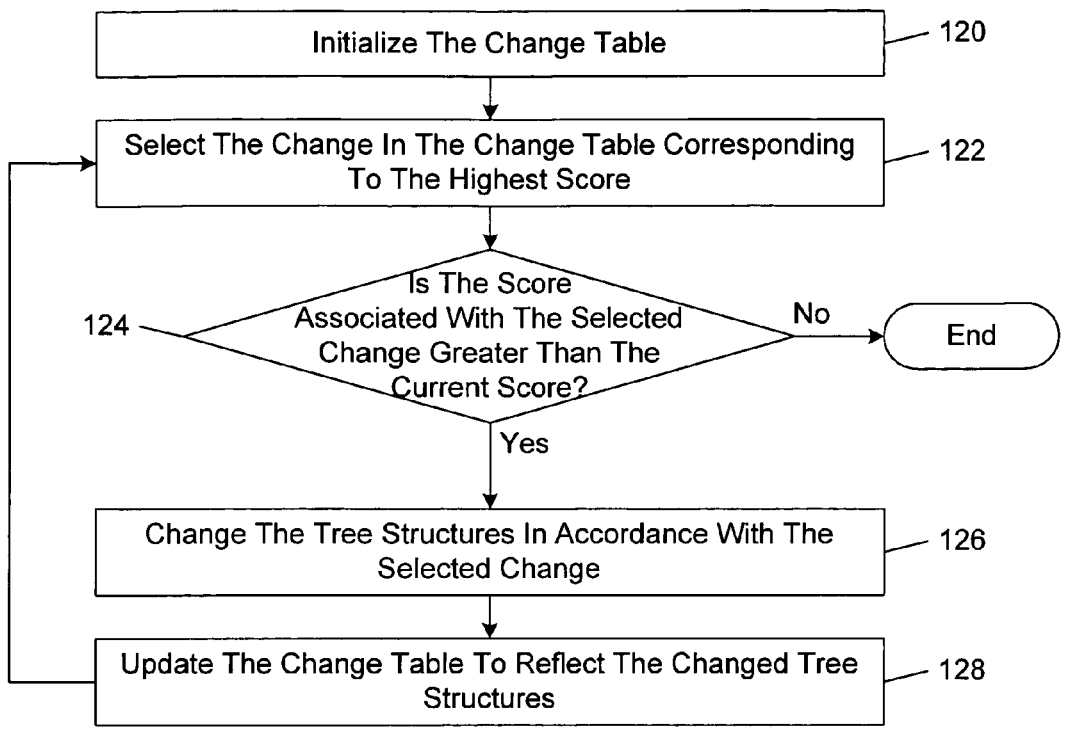
FIG. 11 is a flow diagram of an implementation of the image arranging method of FIG. 9.
Figure 12A:
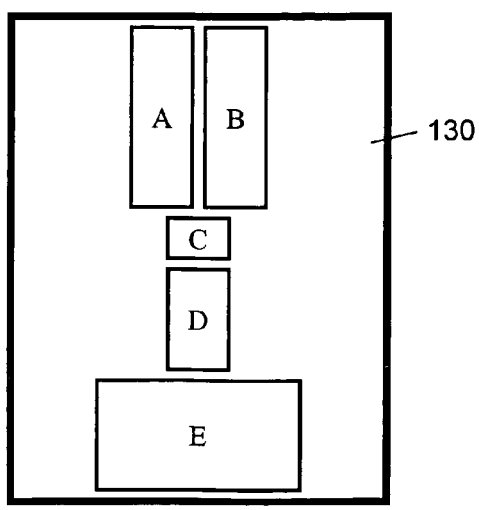
FIG. 12A is a diagrammatic view of an album in an initial state.
Figure 12B:
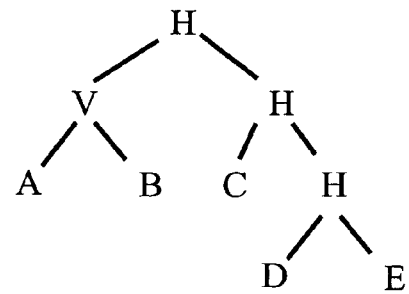
FIG. 12B is a tree structure representing the layout of images on the page of the album shown in FIG. 12A.

FIG. 11 shows a flow diagram of an implementation of the image arranging method of FIG. 9 in which the image arrangement enhancement module 16 tracks candidate successive album states with entries in a change table.

In accordance with this method, the image arrangement enhancement module 16 begins by initializing the change table (block 120). In this process, the image arrangement enhancement module 16 evaluates all the changes in C based on the initial album state 26. In the illustrated embodiment, the way in which a change is evaluated depends on whether the change corresponds to a move or a trade, and whether the image would be moved to a new page or remain on its current page. The process of evaluating changes is described in detail below in section III.B.4.

Next, the image arrangement enhancement module 16 selects the change c* in the change table that corresponds to the highest score (block 122). In this regard, the image arrangement enhancement module 16 determines the row in the change table having the highest score increase value.

If the score associated with the selected change c* is greater than the score of the current album state (block 124), the image arrangement enhancement module 16 changes the tree structures representing the layouts of the images on the pages of the album in accordance with the selected change c* (block 126).

For the purpose of the following discussion, the selected change c* is expanded as c*(I*,P*) where c* equals M or T, I* is the "primary" image affected by the change (i.e., the image being moved or traded), and P* is the page where image I* is to be moved. For completeness, P** is defined as the page where image I* is in the current layout (i.e., before change c* is executed). Note that P* may, or may not, equal P**.

If the change c* that is selected in block 122 represents a move, one or more of the tree structures are modified in block 126 as follows:
  1. image I* is removed from its current page; and
  2. image I* is inserted into page P*

If P* equals P**, the image is removed and then reinserted into the same page, but at a different location.

If the change c* that is selected in block 122 represents a trade, the change table entry for c* also contains the index I** identifying the "exchange image" of the trade. The overall effect of the trade is to move the primary image I* to page P* and the exchange image I to page P. In this case, the tree structures representing the layouts on pages P* and P are modified in block 126** as follows:
  1. primary image I* is removed from page P and exchange image I is removed from page P*; and
  2. primary image I* is added to page P* and exchange image I is added to page P

In this process, the order in which the images are removed in step 1 does not matter. If P* does not equal P, then the order in which images are added in step 2** also does not matter. If P* equals P**, however, the order in which the two images are added back to the layout does matter. In this case, the change table entry c* should further indicate which image (I* or I**) is to be added to the page P* first.

As shown in FIG. 11, after the tree structures have been changed in accordance with the selected change c* (block 126), the change table is updated to reflect the changed tree structures (block 128). In particular, for each change book entry c(I,P') we consider P', and the page P that image I was on before execution of block 126. If either page was affected when block 126 was executed (that is, if either P or P' was changed in step 126), then the change book entry is reevaluated as described below in section III.B.4.

3. Exemplary Operation of the Image Arrangement Enhancement Module

FIGS. 12-16 show the evolution of an exemplary album 130 from an initial album state, through an intermediate album state, to an end album state. FIG. 12A shows a layout of images A-E on a page of the exemplary album 130 in the initial album state. The layout of FIG. 12A is represented by the tree structure shown in FIG. 12B. In the process of evolving the album from the initial state, the image arrangement enhancement module 16 computes the following exemplary change table:

TABLE 1

Change Table for Initial Album State

| Image | Type of Change | Specification of Change Execution | Resulting Net Change in Score |
|---|---|---|---|
| A | Move | ... | 0.00 |
|   | Trade | ... | 0.00 |
| B | Move | ... | 0.80 |
|   | Trade | ... | 0.40 |
| C | Move | ... | 0.00 |
|   | Trade | ... | 0.04 |
| D | Move | ... | 0.00 |
|   | Trade | ... | 1.20 |
| E | Move | Insert image E at node 6 with the new interior node indicating a Vertical division | 2.30 |
|   | Trade | ... | 1.50 |

In the table column entitled "Specification of Change Execution," most of the exemplary entries have been omitted and are replaced with periods of ellipsis. In each row, the score change value at right indicates the difference in score that would result from executing the corresponding change. As can be seen from the table, some changes would not increase the layout score so that the indicated score change value is 0. For example, referring to the top row, moving image A to any other location relative to the current layout would not increase the score. Other changes would increase the layout score; these changes have positive score increase values in the column at far right.

Figure 13:
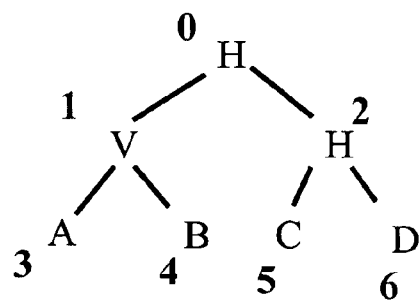
FIG. 13 is a tree structure representing the layout of images on the page of the album shown in FIG. 12A after image E has been deleted from the page.

As shown in Table 1, the change "Move E" has the highest net change in score that would increase the overall score of the album 130. Accordingly, the image arrangement enhancement module 16 executes the change "Move E". As explained above, the process of moving image E involves removing image E from the page and then reintroducing image E back into the page. FIG. 13 shows the tree structure representing the layout of the images after image E has been removed from the page.

Figure 14A:
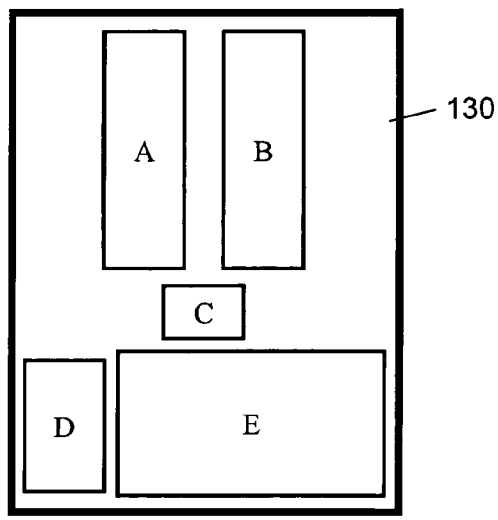
FIG. 14A is a diagrammatic view of the album of FIG. 12A in a successive album state in which image E has been moved to a different layout location.
Figure 14B:
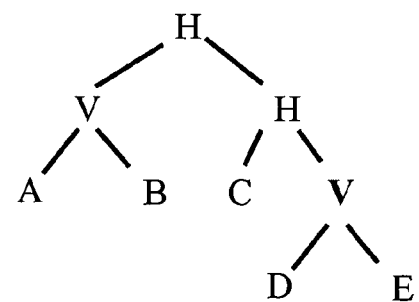
FIG. 14B is a tree structure representing the layout of images on the page of the album shown in FIG. 14A.

FIG. 14A shows a layout of images A-E on the page of the exemplary album 130 in the intermediate album state after the image E has been reintroduced into the page and added to the tree structure of FIG. 13, following the change specification given in Table 1 for change "Move E". The layout of FIG. 14A is represented by the tree structure shown in FIG. 14B. In the process of evolving the album from the intermediate album state, the image arrangement enhancement module 16 computes the following exemplary change table:

TABLE 2

Change Table for Intermediate Album State

| Image | Type of Change | Specification of Change Execution | Resulting Net Change in Score |
|---|---|---|---|
| A | Move | ... | 0.30 |
|   | Trade | ... | 0.30 |
| B | Move | ... | 1.70 |
|   | Trade | ... | 0.40 |
| C | Move | ... | 0.00 |
|   | Trade | ... | 0.04 |
| D | Move | ... | 1.20 |
|   | Trade | First, insert image D at node 4 with the new interior node indicating a Vertical division; then insert image C at node 6 with the new interior node indicating a Horizontal division | 3.40 |
| E | Move | ... | 0.00 |
|   | Trade | ... | 1.30 |

Figure 15A:
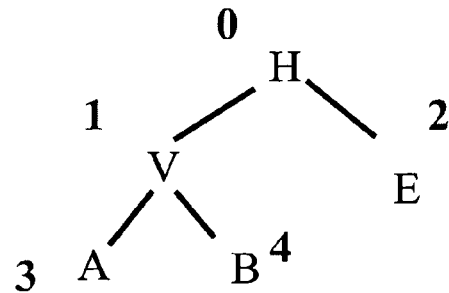
FIG. 15A is a tree structure representing the layout of images on the page of the album shown in FIG. 14A after images C and D have been deleted from the page.
Figure 15B:
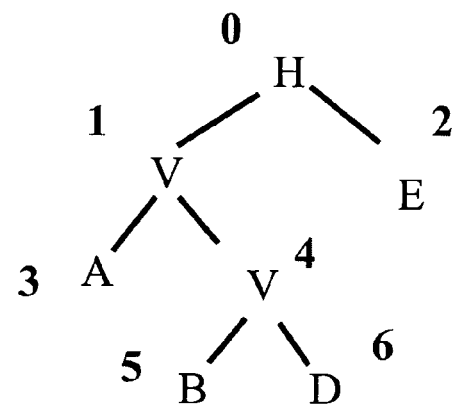
FIG. 15B is a tree structure representing the layout of images corresponding to the tree structure shown in FIG. 15A after image D has been added to the page.

As shown in Table 2, the change "Trade D" has the highest net change in score that would increase the overall score of the album 130. Accordingly, the image arrangement enhancement module 16 executes the change "Trade D", which involves trading images C and D. With respect to the exemplary album 130, the process of trading images C and D involves removing the images C and D from the page of album 130 and then reintroducing the images C and D back into the same page. FIG. 15A shows the tree structure representing the layout of the images after images C and D have been removed from the page. FIG. 15B shows the tree structure representing the layout of the images after image D has been reintroduced back into the page.

FIG. 16A shows a layout of images A-E on the page of the exemplary album 130 in the end album state after image C has been reintroduced back into the page and added to the tree structure of FIG. 15B. The layout of FIG. 16A is represented by the tree structure shown in FIG. 16B.

4. Evaluating Potential Changes to a Current Album State

In some implementations, the information that is computed in the process of evaluating the possible changes to a current album state is stored in the change table. For example, in some of these implementations, whether a change is allowed and the exact specification of the change (e.g., the image(s) involved, and the location(s) where they are moved) is stored in the change table.

As explained above, the process of initializing the change table (block 120; FIG. 11) involves evaluating all the changes in C based on the initial album state 26. Also as explained above, the process of updating the change table after a change has been executed (block 128; FIG. 11) involves evaluating changes in C that are affected by the change just executed. In the illustrated embodiment, the way in which a change is evaluated depends on whether the change corresponds to a move or a trade, and whether the image would be moved to a new page or remain on its current page. In the following description, it is assumed that in the current layout (that is, the initial album state immediately before execution of block 120, FIG. 11, or the changed album state immediately after execution of block 126, FIG. 11) image I is positioned on page P. As stated earlier, the proposition of any change involves moving an image I from page P to page P', where P may equal P', and where I may not be the only image being moved.

a) Verifying Whether a Change is Allowed

The initial step in each of the following change evaluation methods is to verify whether the corresponding change is allowed. One purpose for this verification is to avoid evaluating changes that would not have any effect (e.g., moving an image to the same page, when it is the only image on the page). Another purpose is to make sure the change would not cause any page to have an unacceptable number of images. If the decision is made that a change is not allowed, then a flag is set in the change table indicating that the change is not allowed, and the evaluation is terminated. Effectively, the change is disqualified at least for the next change, and its status as "disqualified" may be removed only if the change is evaluated again in a future execution of block 128 of FIG. 11).

In some implementations, among the parameters that control whether a change may be allowed are integer values MIN_IPP and MAX_IPP, which represent the minimum and maximum numbers of images that are allowed to appear on any given page. These parameters obey the following relationship:

$$1 < \text{MIN\_IPP} < \text{MAX\_PP} \qquad (17)$$

The values of MIN_IPP and MAX_IPP may be inputs to the image albuming system 10. Alternatively, in some embodiments, the image albuming system 10 scans through the initial tree structures to empirically determine the true minimum and maximum numbers of images on the pages of the initial album 26. Based on these empirically determined values, the image albuming system 10 increases the range of allowable numbers of images per page by subtracting from MIN_IPP and/or adding to MAX_IPP, subject to the relationship in expression (17). In any case, it is assumed that the tree structures representing the layouts of the pages of the initial album 26 are in accordance with these parameter values (i.e., for any initial tree structure, the number of leaves is between MIN_IPP and MAX_IPP inclusive).

b) Evaluating a Move of an Image to a Location on the Same Page

FIG. 17 is a flow diagram of an embodiment of a method of evaluating a move of an image from a layout location on a page to another layout location on the same page.

In accordance with this evaluation method, the image arrangement enhancement module 16 initially verifies whether the move is allowed (block 140). If the change is a move and P equals P', the change is not allowed if the following is true, since this implies there is nowhere to move the image: the number of images on P' is one.

If the move is allowed (block 140), the original page P is copied into a scratch page (block 142). Image I is removed from the scratch page in accordance with the above-described process for removing images from pages (block 144). Image I then is added back into the scratch page in accordance with the above-described process for adding images into pages (block 146).

The image arrangement enhancement module 16 computes the net change in score for the move by subtracting the score of the original page from the score of the scratch page. The image arrangement enhancement module 16 records the net change in score in the change table (block 150).

c) Evaluating a Move of an Image to a Location on a Different Page

Figure 18:
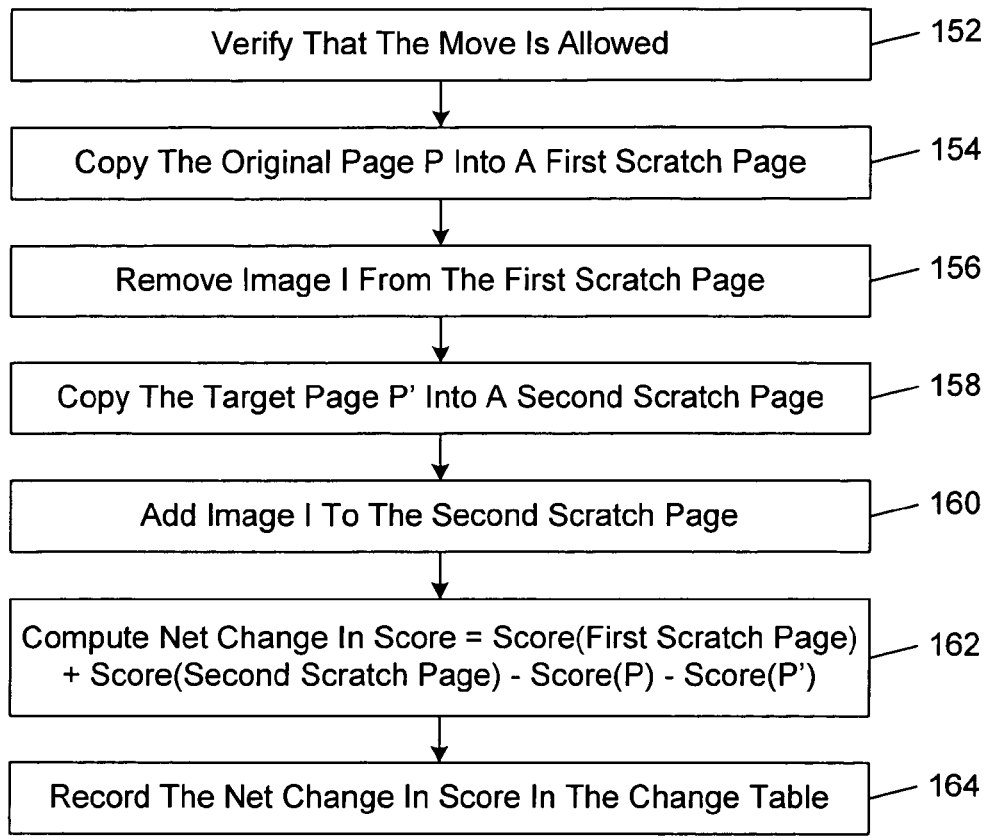
FIG. 18 is a flow diagram of an embodiment of a method evaluating a move of an image from a layout location of a page to another layout location on a different page.

FIG. 18 is a flow diagram of an embodiment of a method of evaluating a move of an image from a layout location of a page P to another layout location on a different page P', where P does not equal P'.

In accordance with this evaluation method, the image arrangement enhancement module 16 initially verifies whether the move is allowed (block 152). For the case where the change is a move and P does not equal P', the change is not allowed if one of the following is true, since it would result in an "illegal" layout:

1. the number of images on P is less than or equal to MIN_IPP; or
2. the number of images on P' is greater than or equal to MAX_IPP.

If the move is allowed (block 152), the original page P is copied into a first scratch page (block 154). Image I is removed from the first scratch page in accordance with the above-described process for removing images from pages (block 156). The target page P' is copied into a second scratch page (block 158). Image I is added to the second scratch page in accordance with the above-described process for adding images to pages (block 160).

The image arrangement enhancement module 16 computes the net change in score for the move by subtracting the scores of the original and target pages P, P' from the sum of the scores of the first and second scratch pages (block 162). The image arrangement enhancement module 16 records the net change in score in the change table (block 164).

d) Evaluating a Trade of Images

Figure 19:
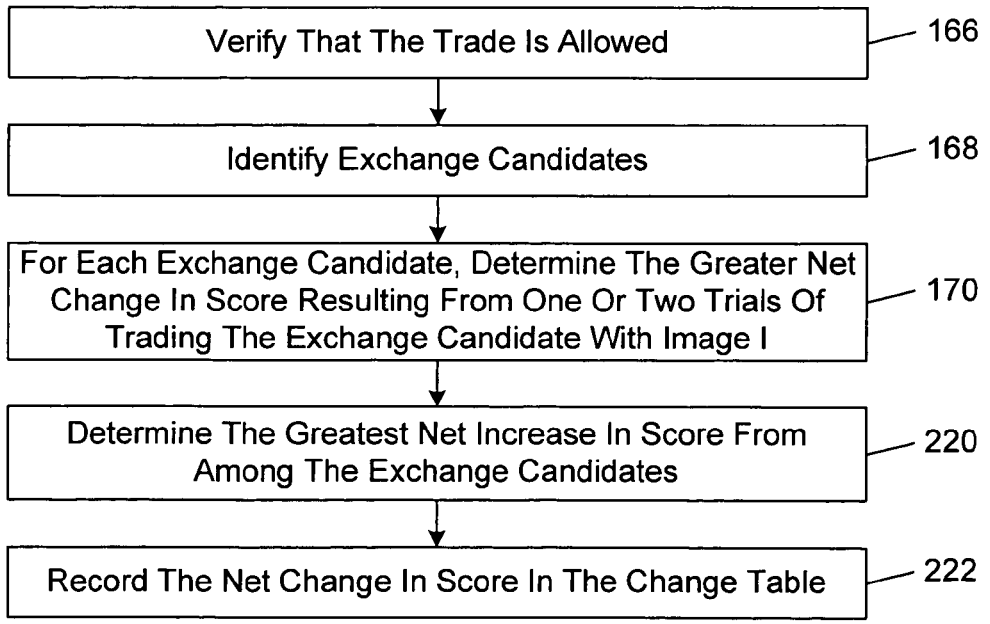
FIG. 19 is a flow diagram of an embodiment of a method of evaluating a change of the layout locations of two images in an album.

FIG. 19 is a flow diagram of an embodiment of a method of evaluating a trade of two images in an album. In this description, the proposed change would move the source image I to the target page P', and the proposed change would move an exchange image from the target page P' to the original page P.

In accordance with this evaluation method, the image arrangement enhancement module 16 initially verifies whether the trade is allowed (block 166). If the change is a trade and P equals P', the change is not allowed if the following is true, since two images are needed for the trade: the number of images on P' is one. When the change is a trade and P does not equal P', the change is not allowed if and only if the following is true: there is no image on target page P' that is allowed to be moved to source page P.

If the trade is allowed (block 166), the image arrangement enhancement module 16 identifies a list of exchange candidates, which may also be called exchange images (block 168). If the change is a trade and P equals P', the list of exchange candidates is the list of images other than image I that are on P. When the change is a trade and P does not equal P', the list of exchange candidates is the list of images on P' that are allowed to be on P.

For each of the exchange candidates identified in block 168, the image arrangement enhancement module 16 determines the greater net change in score resulting from one or two trials of trading the exchange candidate with image I (block 170). This process depends on whether or not P equals P'.

Figure 20:
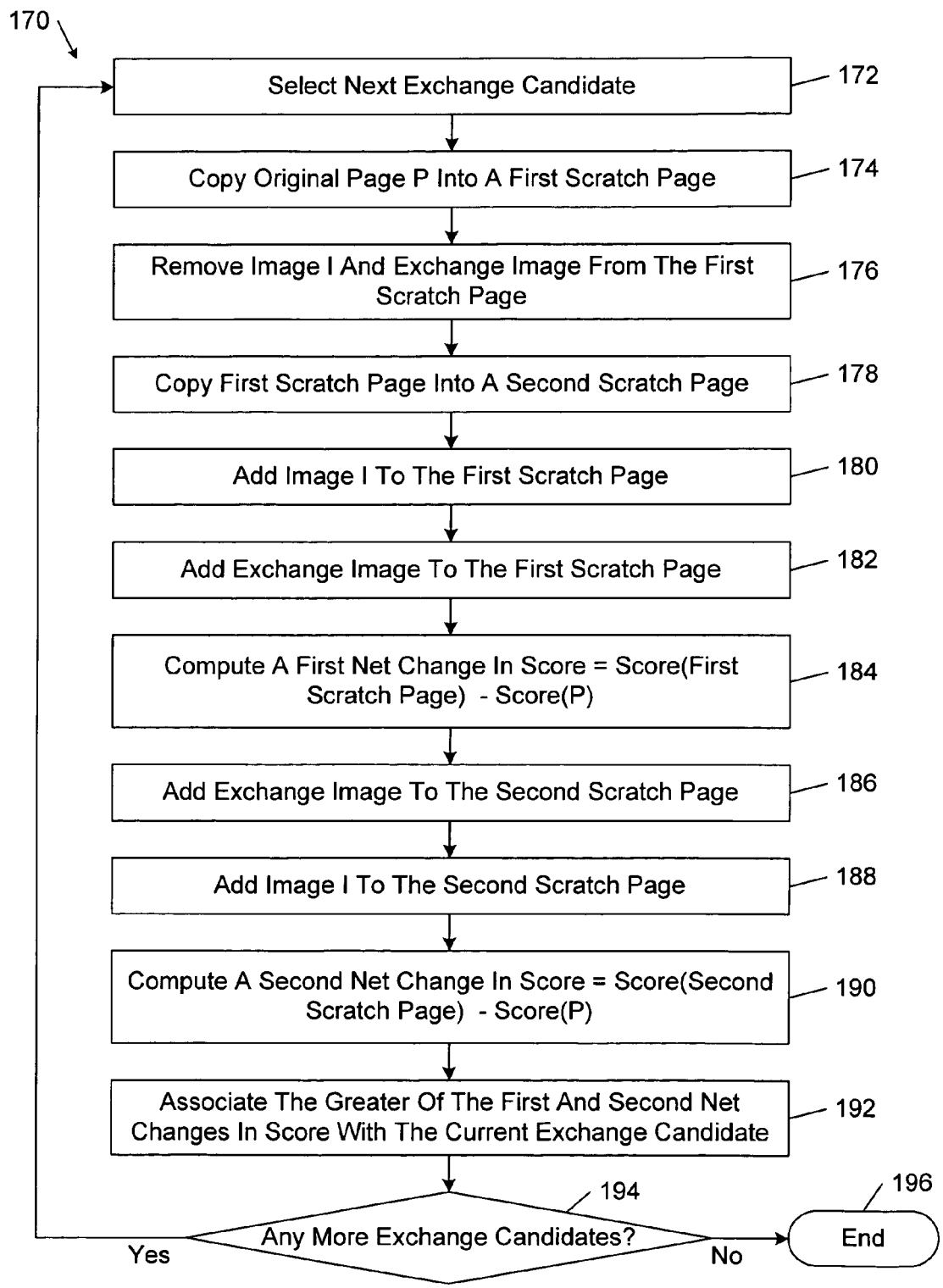
FIG. 20 is a flow diagram of an embodiment of a method of determining the greater net change in score resulting from trading an exchange candidate image on a page with a given image on the same page.

FIG. 20 shows the process of determining the greater net change in score for the case when P equals P'. In this process, the image arrangement enhancement module 16 selects the next exchange candidate (block 172). The original page P is copied into a first scratch page (block 174). The image I and the exchange image are removed from the first scratch page (block 176). The first scratch page is copied into a second scratch page (block 178). Image I is added to the first scratch page (block 180). The exchange image is added to the first scratch page (block 182). A first net change in score is computed by subtracting the score of the original page P from the score of the first scratch page (block 184). The exchange image is added to the second scratch page (block 186). Image I is added to the second scratch page (block 188). A second net change in score is computed by subtracting the score of the original page P from the score of the second scratch page (block 190). The image arrangement enhancement module 16 then associates the greater of the first and second net changes in score with the current exchange candidate (block 192). The process is repeated for each of the identified exchange candidates (block 194) then the process is terminated (block 196).

Figure 21:
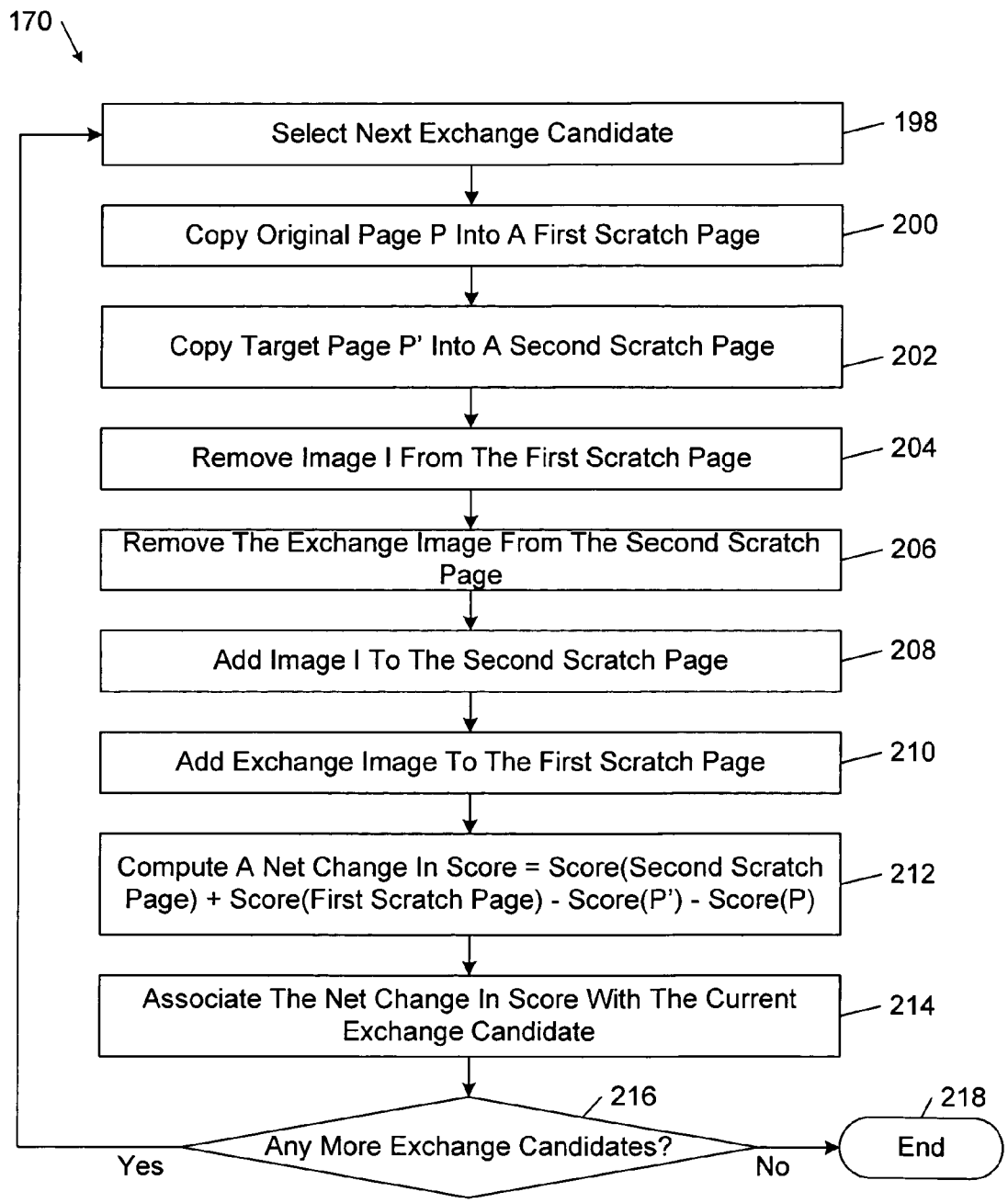
FIG. 21 is a flow diagram of an embodiment of a method of determining the greater net change in score resulting from trading an exchange candidate image on a page with a given image on a different page.

FIG. 21 shows the process of determining the greater net change in score for the case when P does not equal P'. In this process, the image arrangement enhancement module 16 selects the next exchange candidate (block 198). The original page P is copied into a first scratch page (block 200). The target page P' is copied into a second scratch page (block 202). The image I is removed from the first scratch page (block 204). The exchange image is removed from the second scratch page (block 206). Image I is added to the second scratch page (block 208). The exchange image is added to the first scratch page (block 210). A net change in score is computed by subtracting the scores of the original page P and the target page P' from the sum of the scores of the first scratch page and the second scratch page (block 212). The image arrangement enhancement module 16 then associates the computed net change in score with the current exchange candidate (block 214). The process is repeated for each of the identified exchange candidates (block 216) then the process is terminated (block 218).

Referring back to FIG. 19, after of the exchange candidates have been scored (block 170), the image arrangement enhancement module 16 determines the greatest net increase in score from among the exchange candidates (block 220). The image arrangement enhancement module 16 records the greatest net change in score in the change table (block 222).

IV. CONCLUSION

Other embodiments are within the scope of the claims.

The systems and methods described herein are not limited to any particular hardware or software configuration, but rather they may be implemented in any computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM.

What is claimed is:

1. A machine-implemented method of arranging images on pages of an album having multiple potential states each corresponding to a respective arrangement of the images on the pages, comprising:
    (a) receiving the album in an initial one of the states;
    (b) determining a series of successive ones of the states of the album from the initial state to an end one of the states, wherein each of the successive states is selected from candidate ones of the states in a respective neighborhood of a corresponding preceding one of the states in the series based on a heuristic evaluation of the respective arrangements of the images on the pages of the album in the candidate states; and
    (c) generating a description of the arrangement of images of the album in the end state;
    wherein (b) comprises determining the candidate states in the neighborhood of a current one of the states in the series, the determining of the candidate states comprises changing the layout locations of different respective ones of the images in the arrangement corresponding to the current state to identify the candidate states in the neighborhood of the current state, and the changing comprises moving a selected one of the images from a layout location on a selected one of the pages in the current state arrangement to a layout location on a different one of the pages.

2. The method of claim 1, wherein the moving comprises deleting the selected image from the selected page and reintroducing the selected image into the different page based on an evaluation of multiple candidate layouts derived from a layout of the images on the different page.

3. A machine-implemented method of arranging images on pages of an album having multiple potential states each corresponding to a respective arrangement of the images on the pages, comprising:
    (a) receiving the album in an initial one of the states;
    (b) determining a series of successive ones of the states of the album from the initial state to an end one of the states, wherein each of the successive states is selected from candidate ones of the states in a respective neighborhood of a corresponding preceding one of the states in the series based on a heuristic evaluation of the respective arrangements of the images on the pages of the album in the candidate states; and
    (c) generating a description of the arrangement of images of the album in the end state;
    wherein (b) comprises determining the candidate states in the neighborhood of a current one of the states in the series, the determining of the candidate states comprises changing the layout locations of different respective ones of the images in the arrangement corresponding to the current state to identify the candidate states in the neighborhood of the current state, and the changing comprises selecting a first image on a first one of the pages in the current state arrangement, selecting a second image on a second one of the pages in the current state arrangement, moving the first image to the second page, and moving the second image to the first page.

4. A machine-implemented method of arranging images on pages of an album, comprising:
    (a) receiving an initial arrangement of the images on the pages of the album;
    (b) determining different candidate arrangements of the images on the pages of the album, wherein each of the candidate arrangements corresponds to the initial arrangement with at least one of the images at a different respective location in the album;
    (c) evaluating the candidate arrangements;
    (d) selecting one of the candidate arrangements based on the evaluation;
    (e) iteratively repeating (b), (c) and (d) with the respective candidate arrangement selected in each iteration as the initial arrangement in each corresponding successive iteration; and
    (f) generating a description of the candidate arrangement of images on the pages of the album selected in a final iteration of (e);
    wherein the initial arrangement received in (b) comprises an initial set of layouts of respective subsets of the images on corresponding ones of the pages in accordance with an initial allocation of the images among the pages determining at least one of the candidate arrangements comprises changing the initial allocation of the images among the pages and determining a set of layouts of respective subsets of the images on corresponding ones of the pages in accordance with the changed allocation, and changing the initial allocation comprises moving one of the images from one of the pages to another one of the pages.

5. The method of claim 4, wherein the pages are arranged in an ordered sequence, and further comprising prohibiting the moving of one of the images from a first one of the pages to a second one of the pages separated from the first one of the pages by more than a prescribed number of intervening pages in the sequence.

6. A machine-implemented method of arranging images on pages of an album, comprising:
    (a) receiving an initial arrangement of the images on the pages of the album;
    (b) determining different candidate arrangements of the images on the pages of the album, wherein each of the candidate arrangements corresponds to the initial arrangement with at least one of the images at a different respective location in the album;
    (c) evaluating the candidate arrangements;
    (d) selecting one of the candidate arrangements based on the evaluation;
    (e) iteratively repeating (b), (c) and (d) with the respective candidate arrangement selected in each iteration as the initial arrangement in each corresponding successive iteration; and
    (f) generating a description of the candidate arrangement of images on the pages of the album selected in a final iteration of (e);
    wherein the initial arrangement received in (b) comprises an initial set of layouts of respective subsets of the images on corresponding ones of the pages in accordance with an initial allocation of the images among the pages determining at least one of the candidate arrangements comprises changing the initial allocation of the images among the pages and determining a set of layouts of respective subsets of the images on corresponding ones of the pages in accordance with the changed allocation, and, wherein changing the initial allocation comprises moving multiple images from respective ones of the pages to different respective ones of the pages.

7. The method of claim 6, wherein changing the initial allocation comprises trading one of the images on one of the pages with another one of the images on another one of the pages.

* * * * *

UNITED STATES PATENT AND TRADEMARK OFFICE
CERTIFICATE OF CORRECTION

| | | |
|---|---|---|
| PATENT NO. | : 8,161,377 B2 | Page 1 of 1 |
| APPLICATION NO. | : 11/069512 | |
| DATED | : April 17, 2012 | |
| INVENTOR(S) | : C. Brian Atkins | |

It is certified that error appears in the above-identified patent and that said Letters Patent is hereby corrected as shown below:

In column 20, line 19, in Claim 4, delete "pages" and insert -- pages, --, therefor.

In column 20, line 54, in Claim 6, delete "pages" and insert -- pages, --, therefor.

In column 20, line 59, in Claim 6, delete "and, wherein" and insert -- and --, therefor.

Signed and Sealed this
Eleventh Day of December, 2012

David J. Kappos
*Director of the United States Patent and Trademark Office*